United States Patent Office 3,518,302
Patented June 30, 1970

3,518,302
PROCESS FOR THE PREPARATION OF ALPHA NITRO-KETONES AND CARBOXYLIC ACIDS
Alan F. Ellis, Murrysville, Pa., assignor to Gulf Research & Development Company, Pittsburgh, Pa., a corporation of Delaware
No Drawing. Continuation-in-part of application Ser. No. 527,769, Feb. 16, 1966. This application Jan. 23, 1967, Ser. No. 610,824
Int. Cl. C07c 57/02, 53/00, 53/22
U.S. Cl. 260—526
25 Claims

ABSTRACT OF THE DISCLOSURE

A process for the preparation of an alpha nitro-ketone by:
(1) heating a nitro-nitroso compound where the nitro and nitroso groups are on adjacent carbon atoms and where the carbon atom bearing the nitroso group also bears a hydrogen atom,
(2) in the presence of an aqueous solution of an acid catalyst having a dissociation constant at 25° C. of greater than $10^{-2}$,
(3) under reaction conditions such that there is substantially no thermal carbon to nitrogen bond cleavage and substantially no carbon to carbon bond cleavage.
When the alpha nitro-ketone has at least four carbon atoms and at least on hydrogen atom attached to the same carbon atom which bears the nitro group, it can be converted to a carboxylic acid by contacting the alpha nitro-ketone with an immiscible aqueous solution of a catalyst comprising a compound which, when dissolved in water, results in the production of hydroxyl ions.

---

This application is a continuation-in-part of my prior co-pending application, Ser. No. 527,769, filed Feb. 16, 1966, now abandoned and assigned to the same assignee as the present application.

This invention relates to a process for the preparation of alpha nitro-ketones and the subsequent treatment of these ketones to produce carboxylic acids.

Prior art processes for the production of alpha nitro-ketones involved the nitration of methyl ketones, and these processes were unsatisfactory due to poor efficiencies, especially in the case of alkyl methyl ketones having more than three carbon atoms. In addition, the processes suffered from the necessary expense involved in obtaining the ketone charge stock. A process has now been discovered for the preparation of alpha nitro-ketones from selected nitro-nitroso compounds.

In accordance with the invention, an alpha nitro-ketone is prepared by a process which comprises heating a nitro-nitroso compound where the nitro and nitroso groups are on adjacent carbon atoms and where the carbon atom bearing the nitroso group also bear a hydrogen atom in the presence of a liquid reaction medium comprising water and an acid having a dissociation constant at 25° C. in water of greater than $10^{-2}$, and wherein the weight percent anhydrous acid content of said reaction medium is less than 60, and wherein said reaction medium the stoichiometric ratio of water and the stoichiometric ratio of acid to the nitro-nitroso compound are at least 0.8:1, and under reaction conditions such that there is substantially no thermal carbon to nitrogen bond cleavage and substantially no carbon to carbon bond cleavage.

In one preferred embodiment of the invention, the nitro-nitroso compound is first dissolved in a solvent material before being contacted with said reeaction medium, said solvent material being such that it is also miscible with the reaction medium.

The charge stock comprises a nitro-nitroso compound where the nitro and nitroso groups are on adjacent carbond atoms, and where the carbon atom bearing the nitroso group also bears a hydrogen atom. The preferred nitro-nitroso compounds have the formula:

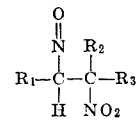

where $R_1$ can be a hydrocarbon radical having from 1 to 23 carbon atoms and $R_2$ and $R_3$ can be the same or different and are selected from the group consisting of hydrogen and a hydrocarbon radical having between 1 and 23 carbon atoms, and wherein the sum of the carbon atoms in $R_1$, $R_2$ and $R_3$ is no more than 23, preferably between 2 and 14. The more preferred compounds are those wherein $R_1$ is a hydrocarbon radical having between 2 and 14 carbon atoms, and $R_2$ and $R_3$ are hydrogen.

The nitro-nitroso compounds defined above dimerize through the nitroso group, and the dimers have the formula:

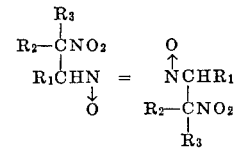

where $R_1$, $R_2$ and $R_3$ are as defined above.

The nitro-nitroso compound can be prepared by any suitable procedure such as that disclosed in my co-pending Ser. No. 597,512, filed Nov. 29, 1966, which is a continuation-in-part of Ser. No. 517,790, filed Dec. 30, 1965. This procedure comprises reacting a charge stock comprising an olefinic hydrocarbon selected from the group consisting of a monoolefinic hydrocarbon and a non-conjugated diolefinic hydrocarbon with a nitrosating agent comprising a mixture of NO and $NO_2$ wherein the molar ratio of NO to $NO_2$ is at least 1:1 under conditions of temperature and pressure such that the $NO_2$ is substantially entirely in the vapor phase, and wherein the stoichiometric ratio of the nitrosating agent to the olefinic hydrocarbon is less than 0.5, preferably between 0.1 and 0.35. The olefinic hydrocarbon charge stock suitably can contain between 2 and 25 carbon atoms when the olefinic hydrocarbon is a monoolefin. When the olefinic hydrocarbon is a non-conjugated diolefin, the charge stock can suitably contain between 5 and 25 carbon atoms. Mixtures of monoolefins and non-conjugated diolefins can also be employed. By a conjugated diolefinic hydrocarbon is meant any diolefinic hydrocarbon where the olefinic double bonds are in an alpha-gamma relationship, for example, 1,3-butadiene. Conversely, a non-conjugated diolefin is an olefinic hydrocarbon containing two olefinic double bonds which are not in an alpha-gamma relationship to each other. The preferred olefins are the monoolefins and the more preferred olefins are the aliphatic and alicyclic monoolefins which have no branching on the alpha or beta carbon atoms. The olefinic hydrocarbon is preferably an alpha olefin having the formula

R′—CH=CH₂ where R′ can be hydrogen or an alkyl radical having between 1 and 23 carbon atoms. Non-polar diluents, such as excess olefin, paraffins or aromatics can be included in the charge stock. The temperature is usually between 0° C. and the melting point of the nitro-nitroso compound, which is usually 85°–100° C. The preferred temperature of reaction is between 10° and 60° C., while the most preferred temperature is between 20° and 50° C. Pressures vary between 0.5 and 20 atmospheres depending on the concentration of $NO_2$ in the nitrosating agent. As the amount of $NO_2$ increases, the allowable pressure decreases since the $NO_2$ must be substantially entirely in the vapor phase. The preferred nitrosating agents are $N_2O_3$ and NO catalyzed with $NO_2$. In general, the reaction time is between 0.5 and 10 hours or more, with the usual reaction time being between 1 and 3 hours. The nitro-nitroso compound which is formed dimerizes, as noted above, through the nitrosos group and at least partially and preferably substantially completely precipitates during reaction. Care must be taken to insure that the dimer which is formed does not decompose to unwanted side products. Decomposition is promoted at the higher reaction temperatures and when the stoichiometric ratio of the nitrosating agent to the olefinic charge stock is above 0.5. The higher reaction temperatures can be compensated somewhat by shorter reaction times. However, due to the length of time necessary for recovery of the dimer, it is critical that the recovery of the dimer be effected at temperatures less than 50° C., so as to prevent decomposition of the nitro-nitroso compound to nitro olefins and other undesired products. Recovery of the solid dimer can be by filtration or centrifugation from a cooled reaction product or by distillation to remove unreacted olefin and solvent under greatly reduced pressure so long as the temperature is maintained below 50° C. and the distillation is not prolonged.

Examples of suitable nitro-nitroso compounds include, but are not limited to, bis(1-nitro-2-nitroso butane);
bis(1-nitro-2-nitroso pentene-4);
bis(1-nitro-2-nitroso hexane);
bis(1-nitro-2-nitroso hexene-5);
bis(1-nitro-1-ethyl-2-nitroso pentane);
bis(1-nitro-2-nitroso-4-methyl-octane);
bis(1-nitro-2-nitroso decane);
bis(1-nitro-2-nitroso decene-9);
bis(1-nitro-2-nitroso dodecane);
bis(1-nitro-2-nitroso hexadecane);
bis(1-nitro-2-nitroso eicosane);
bis(1-nitro-2-nitroso pentacosane);
bis(3-nitro-4-nitroso octane);
bis(6-nitro-7-nitroso dodecane);
bis(1-nitro-2-nitroso cyclohexane); and monomers of the above.

As noted above, the nitro-nitroso compound dimerizes through the nitroso group and forms a solid. When the solid dimer was heated in water or in aqueous base (NaOH), a dark oily mixture of products was produced which was not analyzed further. When the nitro-nitroso compound was heated in the presence of sulfuric acid having an $H_2SO_4$ content of 70 percent, a violent reaction occurred on heating and no alpha nitro-ketone was recovered. It was found, however, that the nitro-nitroso compound can be converted in good yields with good efficiency to an alpha nitro-ketone when heated in the presence of a strong acid by proper control of acid concentration and amount, in addition to proper control of the reaction conditions including time and temperature. For example, when the dimer was heated in aqueous HCl containing 37 weight percent HCl, a white crystalline product was unexpectedly obtained which, upon analysis, proved to be an alpha nitroketone. By an alpha nitro-ketone is meant a ketone which contains a nitro ($-NO_2$) group attached to a carbon atom adjacent the keto function. Hydroxyl amine hydrochloride ($NH_2OH \cdot HCl$) was also obtained in an amount equivalent to the ketone produced. Sufficient acid must therefore be present to form the hydroxyl amine salt by-product, or the solution will become neutral or basic resulting in loss of the charge stock to the dark oily type products noted above. In addition, sufficient water must be present to form the hydroxyl amine. The stoichiometric ratio of the acid and the stochiometric ratio of water to the nitro-nitroso compound must be at least 0.8:1. The stoichiometric ratio of acid to the nitro-nitroso componud is preferably about 1:1. The stoichiometric ratio of acid to nitro-nitroso compound can be as high as 2:1 to 100:1, or more, but the use of higher amounts of acid serves no additional purpose and tends to cause unwanted carbon to carbon bond cleavage. The stoichiometric ratio of water to the nitro-nitroso compound is preferably between 1:1 and 50:1 and can be as high as 500 to 1000:1 or more. The higher amounts of water require added solvent for the preferred one phase operation.

The acid should be a relatively strong acid soluble in water. The strength of the acid should be such that it has a dissociation constant in water at 25° C. of greater than $10^{-2}$. The preferred acids are the mineral acids having dissociation constants in water at 25° C. of greater than $10^{-2}$. Examples of suitable acids include, but are not limited to, hydrochloric (HCl); sulfuric ($H_2SO_4$); sulfurous ($H_2SO_3$); chlorosulfonic; nitric; ortho, pyro and meta phosphoric; trichloroacetic; chloroacetic and oxalic.

The concentration of acid has also been found to be critical in order to minimize carbon to carbon bond cleavage. It has been found that in order to produce the alpha nitro-ketone in good yield and with good selectivity, the anhydrous acid concentration should not exceed 60 weight percent of the liquid reaction medium, which reaction medium includes the total reaction mixture exclusive of the nitro-nitroso compound. The preferred anhydrous acid concentration is between 2 and 25, and more preferably between 2 and 10 weight percent of the nitro-nitroso free reaction mixture. At anhydrous acid concentrations above 60 weight percent, the reaction can be violent, and a nitro-ketone is not recovered.

In one preferred embodiment of the invention, the nitro-nitroso compound is initially dissolved in a solvent in which the water and acid of the reaction medium are also soluble. It is preferred that a sufficient amount of solvent be employed so that the reaction is run in one phase to achieve better contact of the reactants. Lesser amounts of solvent can be employed, such as an amount necessary to dissolve the nitro-nitroso dimer. The volume ratio of solvent to water is usually within the range of 1:1 to 500:1, with preferred ratios between 20:1 and 150:1, with the exact ratio depending on the temperature, type of solvent, carbon number of the nitro-nitroso compound, etc.

The solvent should, of course, be inert in the sense that it does not react or complex with any of the other components of the reaction mixture under the conditions of this reaction. In addition, it is preferred the solvent have a boiling point between 25° and 150° C. so that the reaction temperature can be controlled by reflux of the solvent. Suitable classes of compounds which can serve as solvents include lower ketones having between 3 and 6 carbon atoms; lower ethers having between 2 and 6 carbon atoms; and lower organic acids having between 1 and 3 carbon atoms. The preferred solvent is acetone.

Examples of suitable solvents include, but are not limited to: acetone; methylethylketone; methylisobutylketone; dimethylsulfoxide; diethylether; dioxane; tetrahydrofuran; acetic acid; and propionic acid.

The minimum reaction temperature is that temperature wherein at least a portion of the nitro-nitroso compound is in the liquid phase. The nitro-nitroso compound is normally a solid and can be liquefied by dissolving the nitro-nitroso compound in a solvent, such as acetone, or increasing the reaction temperature to increase the solvent power of the reaction medium and, indeed, to melt the nitro-nitroso compound, if desired. Water and the dilute aqueous acids employed do not serve as solvents for the nitro-nitroso compound, and reaction temperatures exceeding the melting point of the nitro-nitroso compound are usually employed in the absence of a solvent so that the nitro-nitroso compound is substantially entirely in the liquid phase. The presence of a solvent is preferred since lower reaction temperatures can be employed, thus minimizing the loss of nitro-nitroso compound to undesired thermal breakdown by-products, such as nitro-olefins. The reaction temperatures can suitably be between 25° and 150° C., with the preferred reaction temperatures being between 40° and 100° C. The lower reaction temperatures within this range can be used when a solvent is employed, such as temperatures between 25° and 80° C., whereas temperatures between 80° C. and 100° C. are preferred when a solvent-free system is employed. The upper reaction temperatures should not exceed 150° C. because unwanted thermal decomposition of the charge stock occurs, i.e. carbon to nitrogen and carbon to carbon bond cleavage, even at short reaction times.

The reaction pressure is not critical and is necessary only to maintain the reaction mixture substantially in the liquid phase. The preferred pressure is atmospheric, but higher or lower pressures, such as 0.5 to 100 atmospheres can be employed.

The time for the conversion of the nitro-nitroso compound to the nitro-ketone can suitably be between five minutes and twenty hours, with the usual reaction times being between thirty minutes and ten hours.

The reaction conditions to employ, i.e. time, temperature and pressure, are so chosen that substantially no thermal carbon to nitrogen bond cleavage occurs and substantially no carbon to carbon bond cleavage occurs. Thermal carbon to nitrogen bond cleavage promotes the formation of unwanted nitro-olefins by cleavage of the nitroso group, while carbon to carbon bond cleavage results in the formation of lower molecular weight products. In general, the higher the reaction temperature, the higher the stoichiometric ratio of acid to the nitro-nitroso compound, and the higher the acid concentration, the shorter must be the reaction time. The reaction conditions to employ are also, of course, dependent upon the carbon number of the charge stock, as well as whether a reaction solvent is employed. The exact reaction conditions to employ for any particular charge stock with or without a solvent and using the amounts and concentration of acid defined above, will fall within the broad ranges for temperature, pressure and contact time given above. By substantially no thermal carbon to nitrogen bond cleavage and substantially no carbon to carbon bond cleavage is meant that no more than 20 weight percent of the nitro-nitroso compound is lost to products other than the desired alpha nitro-ketone.

One method for determining when the reaction is complete is to follow it colorimetrically. The nitro-nitroso monomer has a distinctive blue-green coloration which is not true of the alpha nitro-ketone or degradation products. If the reaction is permitted to continue much beyond the time when the blue-green coloration disappears from the reaction mixture, the alpha nitro-ketone will continue to react to form carbon to carbon bond cleavage products, especially at the more severe reaction conditions. The color can be monitored visually or by any suitable means, such as by a spectrometer which can determine the intensity and wave length of light transmitted by the reaction solution. The wave length of light transmitted by the blue-green reaction will vary depending on the type and amount of solvent employed, but will be between 300 and 600 millimicrons. The intensity of light transmission will depend on the concentration of the nitro-nitroso monomer in the reaction solution. A decrease in intensity is directly proportional to conversion. When the intensity of light having a wave length between 300 and 600 millimicrons transmitted through the reaction solution, is less than 10 percent of its original value, the reaction is nearing completion and steps can be taken to end the reaction. For example, removal of the reaction solvent, if employed can be initiated. It is preferred that the reaction be run for a time period which is less than 110 percent, preferably between 95 and 105 percent, of the time required for the intensity of light having a wave length between 300 and 600 millimicrons transmitted through the reaction medium to decrease to less than one percent of the intensity value of the reaction medium at the start of the reaction.

The reaction can be run in any suitable manner, i.e. by a batch or continuous method. In a batch method, appropriate quantities of nitro-nitroso compound, water and acid can be added to a reaction vessel, brought to reaction temperature and stirred until the reaction is complete. For a continuous method, appropriate quantities of nitro-nitroso compound, preferably in solution, and aqueous acid can be admixed and passed through a coil reactor of sufficient length to insure completeness of the reaction. Other reaction methods can also be used, such as the continuous addition of separate streams of nitro-nitroso compound, water and acid to a reaction zone with a provision for continuous removal of product. The important feature in the reaction zone is that it be maintained at least slightly acidic so that unwanted side reactions are minimized.

The reaction product, if it contains a solvent, is treated by any suitable procedure, such as distillation, to separate the solvent from the other reaction products. Once the solvent is separated, the remainder of the reaction product is sent to a liquid-liquid separator where an aqueous phase containing water, the hydroxyl amine salt and excess acid is removed from the bottom and an organic phase containing the nitro-ketone is removed from the top.

The invention will be further described with reference to the following experimental work.

In all of the experimental work, unless otherwise indicated, the nitro-nitroso compound used as the charge stock was bis(1-nitro-2-nitroso octane) which was prepared by the reaction of $N_2O_3$ or NO catalyzed with $NO_2$ with octene-1. A typical example is as follows:

Gaseous $N_2O_3$ was bubbled through four moles of octene-1 held at 36° C. for one hour at which time 0.66 mole of $N_2O_3$ had been added. The stoichiometric ratio of effective nitrogen oxides to olefin was 0.66:4 or 0.165. The weight of solid dimer isolated by filtration was 89 grams. The $N_2O_3$ was completely consumed and the mole percent conversion based on the $N_2O_3$ was 16.5 percent. The efficiency of the reaction to the formation of dimer is therefore 72 percent, that is, 0.66 mole or 124 grams of monomer (in the form of dimer) were expected and only 89 grams were isolated. When the octene-1 was treated with a stoichiometric ratio of effective nitrogen oxides (1:1 molar $NO:NO_2$) of 0.35, the efficiency to the formation of dimer was again about 70 percent, while the efficiency dropped drastically to 10 percent when the stoichiometric ratio was increased to 0.6.

Analysis showed the dimer to have the empirical formula $C_8H_{15}N_2O_3$. On melting, the dimer formed a green liquid which is characteristic of a nitro-nitroso monomer. The melting point of the dimer was about 94.5° C. The infrared band spectra were the same as those published by J. F. Brown, Jr. in J.A.C.S., vol. 77, page 6341, 1955 for an octene-1 nitro-nitroso dimer.

EXAMPLE 1

In the run for this example, 18.8 grams of bis(1-nitro-2-nitroso octane) (0.1 mole), referred to above, were dissolved in 3 moles of acetone, and this mixture was contacted with 11.2 grams (0.11 mole) of sulfuric acid having an $H_2SO_4$ content of 96 weight percent and 54 grams (3 moles) of water at a temperature of 60° C. (the reflux temperature of acetone) for three hours at atmospheric pressure. The weight percent $H_2SO_4$ based on a nitro-nitroso compound free reaction mixture was 4.5. The acetone was separated by distillation and the remainder of the product, which was liquid, settled into an aqueous and an organic phase. The 1-nitro octanone-2 was crystallized from the organic phase and the yield of ketone was 97 percent of the theoretical amount expected.

EXAMPLE 2

In the run for this example, 130 grams of sulfuric acid having an $H_2SO_4$ content of 96 weight percent was admixed with 130 grams of water, 1000 milliliters of acetone and 1.27 moles of the bis(1-nitro-2-nitroso octane). The weight percent $H_2SO_4$ in the dimer-free reaction mixture was about 10 percent. The stoichiometric ratio of acid to the nitro-nitroso compound was about 1:1. The mixture was heated at 60° C. for seven hours at atmospheric pressure and 92 percent of the theoretical amount of 1-nitro-octanone-2 was recovered.

EXAMPLE 3

In the run for this example, 182 grams of the same bis(1-nitro-2-nitroso octane) (0.97 mole) as used in Example 1 were dissolved in 5 moles of acetone and this mixture was contacted with 389 grams of an aqueous solution containing 17 weight percent HCl. The total moles of HCl added was 1.8, while the weight percent HCl based on the dimer-free reaction mixture was 9.5 weight percent. The contacting occurred at 60° C. for three hours at atmospheric pressure. Recovery of the product was as in Example 1 and 90 percent of the theoretical amount of 1-nitro-octanone-2 was recovered.

Sufficient acetone was present in Examples 1, 2 and 3 to result in a one-phase operation. In Examples 1 and 2, the stoichiometric ratio of acid to nitro-nitroso compound was about 1:1, whereas in Example 3, the stoichiometric ratio of acid to nitro-nitroso compound was about 2:1. In Example 2, a higher acid concentration and longer contact time were employed. The higher percent 1-nitro-octanone-2 achieved in Example 1 as compared with Example 2 is attributed to the lower acid concentration and shorter contact time, while the higher percent ketone in Examples 1 and 2 compared to Example 3 is due to the use of a 1:1 stoichiometric ratio of acid to nitro-nitroso compound, rather than the 2:1 ratio as used in Example 3.

EXAMPLE 4

In the run for this example, 4.12 grams of the octene-1 nitro-nitroso dimer (0.02 mole) were admixed with 100 milliliters (118 grams) of aqueous hydrochloric acid containing 37 weight percent HCl. The total moles of water in the reaction mixture were 4.2, while the total moles of HCl was 1.2. The contacting occured at 100° C. (reflux) for a time of 15 minutes at atmospheric pressure. The organic phase reaction product yielded 75 percent of the theoretical amount of 1-nitro-octanone-2. The stoichiometric ratio of acid to the nitro-nitroso compound was 1.2:0.02 or 60:1.

EXAMPLE 5

In the run for this example, 47 grams of the octene-1 nitro-nitroso dimer (0.25 mole) were admixed with 75 milliliters of aqueous hydrochloric acid having an HCl content of 37 weight percent and 350 milliliters of added water. The reaction mixture contained 22.5 moles of water and 0.9 moles of HCl. The reaction occurred at 100° C. for a time period of 3.5 hours. Analysis of the organic phase showed 58 percent of the theoretical amount of 1-nitro-octanone-2. The stoichiometric ratio of acid to the nitro-nitroso compound was 0.9:0.25 or 3.6:1.

The runs for Examples 4 and 5 were two-phase operations. This, together with a higher temperature (100° C. versus 60° C. in Examples 1–3) and higher stoichiometric ratios of acid to monomer contributed to the lower percent of 1-nitro-octanone-2 in the product than in Examples 1–3.

EXAMPLE 6

In the run for this example, 5 grams of the octene-1 nitro-nitroso dimer were admixed with 50 grams of sulfuric acid having an $H_2SO_4$ content of 70 weight percent. The mixture was heated to 100° C. to melt the dimer and when shaken, a violent reaction occurred and no nitro-ketone was recovered.

A comparison of Examples 1 through 5 with Example 6 shows the criticality of the concentration of acid in the reaction mixture.

EXAMPLE 7

One molar solutions of hydrochloric acid, sulfuric acid and nitric acid were prepared and each admixed separately with the bis(1-nitro-2-nitroso octane) in an amount so that the stoichiometric ratio of nitro-nitroso compound to acid was 1:1. The mixture was heated at 100° C. for four hours. The weight percent acid on a nitro-nitroso compound free mixture was 3.7, 10.1 and 6.3 respectively. The products were analyzed to determine how much carbon to carbon bond cleavage had occurred. The percent heptanoic acid was 10, 7.5 and 10 weight percent of the product respectively. The results illustrate that substantially no carbon to carbon cleavage occurred under these conditions.

EXAMPLE 8

The series of runs in Example 7 were repeated except nitric acid was not used and five molar solutions of the other two acids were employed which corresponded to a stoichiometric ratio of 5:1 of acid to dimer. The weight percent HCl and $H_2SO_4$ based on a nitro-nitroso compound free mixture was 18.5 and 50.5 respectively. The products analyzed 19 percent heptanoic acid for the HCl solution and 28 percent heptanoic acid for the sulfuric acid solution.

A comparison of Example 8 with Examples 1–5 and 7 shows that over-extended periods of time at the higher acid concentrations and ratio results in carbon to carbon bond cleavage, especially if the stoichiometric ratio of acid to dimer is high. As noted above, therefore, it is important in the operation of the process of this invention that the conditions be such that substantially no carbon to carbon bond cleavage occurs in order to produce high yields of the desired alpha nitro-ketone.

EXAMPLE 9

In the run for this example, 5.6 grams (0.03 mole) of the bis(1-nitro-2-nitroso octane) were admixed with 0.5 mole of glacial acetic acid and one milliliter of water. The mixture was heated at 95° C. for four hours. Analysis of the reaction product showed that the presence of no heptanoic acid and very little nitro-ketone.

EXAMPLE 10

Example 9 was repeated except that five milliliters of water were used and substantially the same results were obtained.

Acetic acid has a dissociation constant at 25° C. in water of $1.8 \times 10^{-5}$. A comparison of Examples 8 and 9 with Examples 1 and 2 shows that a weak acid, such as acetic acid, is unsuitable for use in the process of this invention.

EXAMPLE 11

In the run for this example, 21 grams of bis(1-nitro-2-nitroso hexadecane) (0.07 mole); 7.2 grams of sulfuric acid having an $H_2SO_4$ concentration of 96 weight percent; 200 milliliters of acetone and 50 milliliters of water were heated together at 60° C. for four hours. The weight precent $H_2SO_4$ (anhydrous) based on a dimer free mixture was 3, while the stoichiometric ratio of acid to dimer was 1:1. After removal of the acetone, 20 grams of crude organic phase product were obtained from which was recovered 17 grams (0.06 mole) of crystalline 1-nitro-hexadecanone-2 which is 85 percent of the theoretical amount expected. The 1-nitro hexadecanone-2 had a melting point of 89°–90° C. and its structure was proven by infrared analysis.

EXAMPLE 12

In the run for this example, 24.4 grams of bis(1-nitro-2-nitroso dodecane) (0.1 mole); 150 milliliters of acetone; 10.2 grams of sulfuric acid having an $H_2SO_4$ concentration of 96 weight percent and 50 milliliters of water were heated together at 60° C. for two hours. The weight percent anhydrous acid based on a dimer free mixture was about six percent, while the stoichiometric ratio of acid to dimer was 1:1. After removal of the acetone, 25 grams of crude organic phase product were obtained from which was recovered 19 grams of white crystalline 1-nitro-dodecanone-2 which had a melting point of 71°–72° C. The amount of recovered ketone was 88 percent of the theoretical.

Examples 11 and 12 show that the process of this invention is also applicable to the higher carbon number charge stocks.

EXAMPLE 13

Example 2 was repeated except bis(1-nitro-2-nitroso butane) was employed in place of bis(1-nitro-2-nitroso octane). Over 90 percent of 1-nitro-butanone-2 was recovered.

EXAMPLE 14

Example 2 as again repeated except bis(1-nitro-2-nitroso hexane) was employed in place of bis(1-nitro-2-nitroso octane). Over 90 percent of 1-nitro-hexanone-2 was recovered.

Examples 13 and 14 show the process of this invention is also applicable to a variety of the lower carbon number charge stocks.

EXAMPLE 15

Twelve grams (0.16 mole) of $N_2O_3$ were added to 41 grams (0.5 mole) of 1,5-hexadiene over a period of two hours at a temperature of 15° C. The main product was bis(1-nitro-2-nitroso hexene-5) as determined by physical examination and nuclear magnetic resonance. The bis(1-nitro-2-nitroso hexene-5) formed the characteristic green solution on melting at 74°–75° C.

The entire product above was added without intermediate purification to a solution of 16 grams (0.16 mole) of concentrated sulfuric acid (96 percent $H_2SO_4$) and 50 milliliters (2.8 mole) of water in 300 milliliters of acetone. The resulting solution was heated at reflux for three hours in order to convert the dimer to 1-nitro, 2-oxo-hexene-5, i.e., $$H_2C=CH-CH_2-CH_2-\overset{O}{\overset{\|}{C}}-CH_2NO_2$$

The product was distilled to remove about 70 percent of the acetone. The remaining product formed into two phases and the organic phase was further distilled to isolate the nitro-ketone which came over at 81° to 84° C. at two millimoles of mercury pressure. The structure of the nitro-ketone was determined by infrared, nuclear magnetic resonance and mass spectral analyses.

Example 15 shows that unconjugated diolefins can be employed to produce unsaturated alpha nitro-ketone products.

As noted in the examples above, especially Examples 7 and 8, certain alpha nitro-ketones will eventually hydrolyze in the presence of dilute mineral acid to produce a carboxyl acid. However, extended reaction times, high temperatures and/or increased amounts and concentrations of acid are required, and even then, the efficiency to the production of the carboxylic acid suffers since these more severe conditions promote the formation of unwanted by-products, such as nitro-olefins. It has now been discovered that certain alpha nitro-ketones can be converted with excellent efficiency to a carboxylic acid and a nitro-paraffin.

In accordance with the invention, a carboxylic acid is prepared by a process which comprises: contacting an organic phase comprising an alpha nitro-ketone which contains at least four carbon atoms and which has at least one hydrogen atom attached to the same carbon atom which bears the nitro group, with an aqueous phase comprising an aqueous solution of a catalyst comprising a compound which, when dissolved in water, results in the production of hydroxyl ions, wherein said organic phase is substantially immiscible in said aqueous phase, and wherein the molar ratio of water in said aqueous phase to the ketone in said organic phase is at least 0.8:1.

In one aspect of the invention, a carboxylic acid is prepared by a two-step process which comprises: preparing an alpha nitro-ketone by heating a nitro-nitroso compound where the nitro and nitroso groups are on adjacent carbon atoms and where said nitro-nitroso compound has at least four carbon atoms and at least one hydrogen atom attached to the carbon atom which bears the nitro group and at least one hydrogen atom on the carbon atom which bears the nitroso group, in the presence of a liquid reaction medium comprising water and an acid having a dissociation constant at 25° C. in water of greater than $10^{-2}$, and wherein the weight percent anhydrous acid content in said liquid reaction medium is less than 60, and wherein said liquid reaction medium the stoichiometric ratio of water and the stoichiometric ratio of acid to the nitro-nitroso compound are at least 0.8:1, and under reaction conditions such that there is substantially no thermal carbon to nitrogen bond cleavage and substantially no carbon to carbon bond cleavage, recovering said alpha nitro-ketone, and thereafter contacting an organic phase comprising said alpha nitro-ketone with an aqueous phase comprising an aqueous solution of a catalyst comprising a compound which, when dissolved in water results in the production of hydroxyl ions, wherein said organic phase is substantially immiscible in said aqueous phase and wherein the molar ratio of water in said aqueous phase to the ketone in said organic phase is at least 0.8:1.

The alpha nitro-ketone charge stock which can be converted to the carboxylic acid can be any alpha nitro-ketone which contains at least four carbon atoms and which has at least one hydrogen atom attached to the same carbon atom which bears the nitro group. The alpha nitro-ketone preferably has between 4 and 25 carbon atoms and more preferably has between 4 and 16 carbon atoms.

The reaction is believed to occur according to the following equation:

$$R_4-\overset{O}{\overset{\|}{C}}-\underset{R_5}{\overset{H}{\overset{|}{C}}}-NO_2 + H_2O \longrightarrow R_4-\overset{O}{\overset{\|}{C}}-OH + R_5-\underset{H}{\overset{H}{\overset{|}{C}}}-NO_2$$

where $R_4$ is a hydrocarbon radical having between 1 and 23 carbon atoms and $R_5$ is selected from the class consisting of hydrogen and a hydrocarbon radical having between 1 and 23 carbon atoms and wherein the sum of the carbon atoms in $R_4$ and $R_5$ is between 2 and 23, preferably between 2 and 14. It is preferred that $R_5$ be hydrogen and $R_4$ have between 2 and 14 carbon atoms so that the alpha nitro-ketone is a 1-nitro-2-ketone since cleavage of this ketone results in the production of only one carboxylic acid and only one nitro-paraffin, i.e. nitromethane. The carboxylic acid in the preferred embodiment will, of course, always have one less carbon atom than the nitro-ketone.

Examples of suitable nitro-ketones include, but are not limited to:

1-nitro-butanone-2;
2-nitro-butanone-3;

1-nitro-2-oxo-pentene-4 $(H_2C=\underset{H}{\overset{H}{\overset{|}{C}}}-\underset{H}{\overset{H}{\overset{|}{C}}}-\overset{O}{\overset{\|}{C}}-\underset{H}{\overset{H}{\overset{|}{C}}}-NO_2)$ 2-nitro-cyclohexanone;

1-nitro-2-oxo-hexene-5 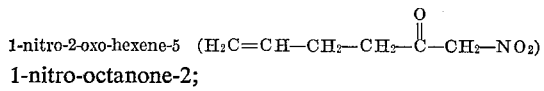
1-nitro-octanone-2;

1-nitro-2-oxo-decene-9 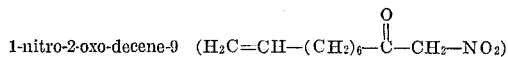
1-nitro-decanone-2;
4-nitro-dodecanone-5;
1-nitro-dodecanone-2;
1-nitro-hexadecanone-2;
1-nitro-4-ethyldodecanone-2;
alpha nitro-acetaphenone; and
1-nitro-eicosanone-2.

The alpha nitro-ketones cleave when heated in the presence of a catalyst comprising a compound which results in the production of hydroxyl ions in water. By the production of hydroxyl ions in water is meant the production of hydroxyl ions having a concentration greater than $10^{-7}$ molar, since pure water has an hydroxyl ion concentration of $10^{-7}$ molar. The preferred catalysts include those selected from the group consisting of ammonia, the amines and compounds having the formula:

MeOX where Me is any alkali metal or alkaline earth metal; O is oxygen; and X is selected from the group consisting of hydrogen, a hydrocarbon radical having between 1 and 23 carbon atoms, and

where R is any hydrocarbon radical having between 1 and 23 carbon atoms. The alkali and alkaline earth metals which are contemplated include lithium; sodium; potassium; rubidium; cesium; beryllium; magnesium; calcium; strontium and barium Examples of suitable catalysts include but are not limited to sodium hydroxide sodium acetate sodium heptanoate; sodium propionate; potassium hydroxide; potassium acetate; sodium methoxide; potassium phenoxide; lime; ammonia; triethylamine; trimethylamine; aniline and pyridine.

The amount of catalyst to employ is not critical and can vary from concentrations as low as 0.005 mole of catalyst per mole of the alpha nitro-ketone to concentrations of 0.7 mole of catalyst per mole of ketone, or more. The preferred concentration of catalyst is between 0.01 and 0.1 mole of catalyst per mole of alpha nitro-ketone.

As noted by the equation above, it is required that at least one mole of water be employed for every mole of alpha nitro-ketone. As a practical matter, however, additional water is required to solubilize the catalyst employed. In general, the molar ratio of water to alpha nitro-ketone varies between 0.8:1 and 1000:1, or more, with preferred molar ratios between 1:1 and 100:1.

It has been found quite unexpectedly that the conversion of the alpha nitro-ketone to the desired carboxylic acid occurs in a much faster rate when the reaction is run in two phases, that is, when the alpha nitro-ketone is in an organic phase which is then contacted with the water and catalyst which are in a separate immiscible liquid phase. The lower carbon number alpha nitro-ketones, such as nitro-acetaldehyde and nitro-acetone are soluble in the aqueous solution of catalyst and therefore cannot be operated successfully in the two-phase process of this invention. Only the higher carbon number alpha nitro-ketones, such as those having at least four carbon atoms are immiscible with the aqueous catalyst solution and form a two-phase reaction mixture. It has been found that when a common solvent such as dioxane, is employed to form a one-phase reaction mixture that the reaction rate for some unexplainable reason is dramatically reduced. In addition, the two-phase process of this invention has the advantage of ease of separation of the aqueous catalyst solution from the unreacted organic charge stock and products. Since this is a two-phase operation wherein the organic and aqueous phases are immiscible in one another, the two phases must be brought into intimate contacting by suitable mixing procedures.

The reaction temperature is not critical and can vary within wide limits. Suitable reaction temperatures are between 20° and 150° C. with preferred temperatures between 40° and 100° C. Temperatures below 20° C. are not suitable, since the rate of reaction becomes undesirably slow. Temperatures above 150° C. are undesirable since they promote unwanted side reactions, such as decomposition of the nitro-methane. The reaction pressure is likewise not critical and can be between 0.5 atmospheres and 100 atmospheres, or more. Pressure should be sufficient to keep the reactants in the liquid phase. Atmospheric pressure is preferred. The reaction time will depend somewhat on temperature and can be between 0.5 and 20 hours. The usual reaction times are between 2 and 5 hours.

The reaction product also consists of an organic phase comprising unreacted alpha nitro-ketone, the desired carboxylic acid, and at least a portion of the nitro-paraffin; and an aqueous phase comprising water, the catalyst and smaller amounts of the carboxylic acid, and the nitro-paraffin depending on their respective solubilities in the aqueous phase. The higher the carbon number of the carboxylic acid and the nitro-paraffin, the less soluble will they be in the aqueous phase, and the organic phase can then be easily separated from the aqueous phase by decantation, siphoning or otherwise and sent for further purification, if desired.

This aspect of the invention will be further described with reference to the following experimental work.

In all of the following examples, unless otherwise indicated, the reaction was a two-phase reaction with the organic phase containing the nitro-ketone and the aqueous phase containing the catalyst.

EXAMPLE 16

In the run for this example, 17.3 grams (0.1 mole) of 1-nitro-octanone-2 were admixed with an excess of water containing 0.05 mole of sodium hydroxide and heated to 100° C. at atmospheric pressure for three hours with constant stirring. The product was sent to a liquid-liquid separator from which an organic phase containing the nitro-methane and heptanoic acid was removed overhead. The percent efficiency to the production of heptanoic acid was 95 percent based on a 100 percent conversion of the 1-nitro-octanone-2. By efficiency is meant the moles of acid produced divided by the moles of ketone converted.

EXAMPLE 17

Example 16 was repeated except only 0.01 mole of NaOH was employed. In addition, the reaction time was extended to four hours. Product analysis showed an efficiency to the production of heptanoic acid of 98 and an efficiency to the production of nitro-methane of 73.

Examples 16 and 17 illustrate that excellent efficiencies to the production of carboxylic acids and nitro-methane from 1-nitro-2-ketones can be achieved by the process of this invention.

A series of runs was made using 1-nitro-butanone-2 as the charge stock. In each of the runs 10 millimoles (mm.) of 1-nitro-butanone-2 (hereinafter referred to as NMEK) were contacted with 10 milliliters of pure water or 10 milliliters of water containing one mm. of sodium hydroxide or sodium propionate at 58° C. for twenty-five minutes with constant stirring. The product was analyzed by gas liquid chromatography.

EXAMPLE 18

In the run for this example, pure water was employed and after twenty-five minutes the mole percent NMEK converted was only three percent. After fifty minutes the conversion was only five percent.

EXAMPLE 19

In the run for this example, sodium hydroxide was employed as the catalyst and a conversion of 94 mole percent NMEK was achieved after twenty-five minutes.

EXAMPLE 20

In the run for this example, sodium propionate was used as the catalyst and a mole percent conversion of NMEK of 93 percent was achieved after twenty-five-minutes.

EXAMPLE 21

Example 19 was repeated except five milliliters of the water was replaced with five milliliters of dioxane so that a one-phase reaction was achieved. A mole percent conversion of NMEK of only 25 percent was achieved after a twenty-five minute reaction period. In addition, it was necessary to remove the ioxane before the water could be separated from the desired propionic acid product.

A comparison of Examples 18–20 shows the advantage of using the catalyst of this invention. A comparison of Examples 19 and 20 shows that the reaction is promoted by using a relatively strong base, i.e. NaOH or a relatively weak base, i.e. sodium propionate, thus showing that the important feature is utilizing a material which will result in the production of an hydroxyl ion concentration greater than $10^{-7}$. A comparison of Examples 19 through 21 shows the advantages of the two-phase process of this invention over a one-phase process which uses a mutual solvent, such as dioxane. When the two-phase operation is employed, such as in Examples 19 and 20, a much faster reaction is achieved, which is a highly desirable result and, in addition, there are no difficulties in separating the undesired water and catalyst from the desired organic acid product. Further, since the aqueous phase containing the catalyst can be easily separated from the organic phase it can be recycled more easily for further reaction.

The following example is given to illustrate that unconjugated diolefins, such as 1,5-hexadiene, can be employed to prepare unsaturated carboxylic acids in accordance with the teachings of this invention.

EXAMPLE 22

Example 15 was repeated to obtain the 1-nitro-2-oxo-hexene-5. The acetone was distilled until the product separated into an organic phase containing the nitro-ketone and an aqueous phase containing the acid catalyst. The organic phase was admixed with a solution of 0.4 gram (0.01 mole) of sodium hydroxide in 200 milliliters of water. The resulting two-phase reaction mixture was then heated for four hours at 50°–60° C. to convert the 1-nitro-2-oxo-hexene-5 to allyl acetic acid (4-penteneoic acid). The resulting solution was cooled to near 0° C. and brought to a pH of three by the addition of cooled concentrated hydrochloric acid in order to free all of the allyl acetic acid. The product was extracted with ether to remove the free acid which was then separated from the ether by distillation. The allyl acetic acid was collected at 55°–58° C. and 2 mm. mercury pressure. The structure of allyl acetic acid was confirmed by this boiling point and by infrared and nuclear magnetic resonance analyses.

It is now possible in the preferred aspects of this invention to convert an alpha olefin efficiently and in good yields to nitro-methane and a carboxylic acid having one less carbon atom in said alpha olefin.

In accordance with the invention, nitro-methane and a carboxylic acid are produced by a process which comprises reacting a charge stock comprising an alpha olefin having between 4 and 25 carbon atoms and a hydrogen atom on the beta carbon atom with a nitrosating agent comprising a mixture of NO and $NO_2$, wherein the molar ratio of NO to $NO_2$ is at least 1:1 and under conditions of temperature and pressure such that the $NO_2$ is substantially entirely in the vapor phase, and wherein the stoichiometric ratio of the nitrosating agent to said alpha olefin is lesss than 0.5; recovering a nitro-nitroso dimer at a temperature less than 50° C. wherein the nitro groups are on the terminal carbon atoms and the nitro and nitroso groups are on adjacent carbon atoms; heating said nitro-nitroso dimer in the presence of an aqueous mineral acid having a dissociation constant greater than $10^{-2}$ and an anhydrous weight percent mineral acid content of less than 60 based on the nitro-nitroso dimer free reaction mixture, said aqueous mineral acid being present in an amount such that the stoichiometric ratio of water and the stoichiometric ratio of mineral acid to the nitro-nitroso compound is at least 0.8:1 and under conditions such that substantially no thermal carbon to nitrogen bond cleavage and substantially no carbon to carbon bond cleavage occurs, and for a time such that a 1-nitro-2-ketone is produced; recovering said 1-nitro-2-ketone; and producing said nitro-methane and said carboxylic acid which has one less carbon atom than said alpha olefin by heating said 1-nitro-2-ketone while in intimate contact with an immiscible water phase containing a catalyst comprising a compound which, when dissolved in water, results in the production of hydroxyl ions, the amount of water being sufficient to dissolve said catalyst and provide a stoichiometric ratio of water to ketone of at least 0.8:1.

Resort may be had to such variations and modifications as fall within the spirit of the invention and the scope of the appended claims.

I claim:

1. A process for the preparation of an alpha nitro-ketone which comprises heating a nitro-nitroso compound where the nitro and nitroso groups are on adjacent carbon atoms and where the carbon atom bearing the nitroso group also bears a hydrogen atom in the presence of a reaction medium comprising water and a soluble acid having a dissociation constant in water at 25° C. of greater than $10^{-2}$, where in said reaction medium the weight percent anhydrous acid is less than 60 and wherein the stoichiometric ratio of water and the stoichiometric ratio of acid to the nitro nitroso compound are at least 0.8:1, and under reaction conditions such that there is substantially no thermal carbon to nitrogen bond cleavage and substantially no carbon to carbon bond cleavage.

2. A process according to claim 1 wherein the reaction medium comprises, in addition, an inert solvent material which is miscible with the aqueous acid and in which the nitro-nitroso compound is soluble.

3. A process according to claim 1 wherein the nitro-nitroso compound has the formula:

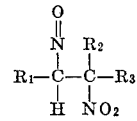

where $R_1$ can be a hydrocarbon radical having from 1 to 23 carbon atoms and $R_2$ and $R_3$ are selected from the group consisting of hydrogen and a hydrocarbon radical having between 1 and 23 carbon atoms, and wherein the sum of the carbon atoms in $R_1$, $R_2$ and $R_3$ is no more than 23, and the soluble acid is a mineral acid having a dissociation constant in water at 25° C. greater than $10^{-2}$.

4. A process according to claim 3 wherein the nitro-nitroso compound has the formula:

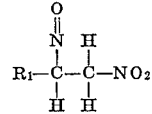

where $R_1$ is a hydrocarbon radical having between 1 and 23 carbon atoms; wherein the reaction medium comprises, in addition, an inert solvent material which is miscible with the aqueous mineral acid and in which the nitro-nitroso compound is soluble; wherein the nitro-nitroso compound is initially dissolved in said inert solvent; and wherein the stoichiometric ratio of acid to the nitro-nitroso compound is about 1:1.

5. A process according to claim 2 wherein the stoichiometric ratio of acid to the nitro-nitroso compound is between 0.8:1 and 2:1; the acid concentration is between 2 and 10 weight percent of said reaction medium; there is sufficient solvent so that the reaction occurs in one phase, and the reaction conditions include a temperature between 25° and 150° C. and a reaction time between five minutes and twenty hours.

6. A process according to claim 5 wherein the reaction time is less than 110 percent of the time required for the intensity of light having a wave length between 300 and 600 millimicrons transmitted by said reaction medium to decrease to less than one percent of the intensity value of the reaction medium at the start of the reaction.

7. A process according to claim 5 wherein the nitro-nitroso compound has between 4 and 16 carbon atoms, the solvent material is acetone, and the reaction occurs at atmospheric pressure and the reflux temperature of acetone.

8. A process according to claim 7 wherein the nitro-nitroso compound is bis(1-nitro-2-nitroso octane).

9. A process according to claim 7 wherein the nitro-nitroso compound is bis(1-nitro-2-nitroso-hexane).

10. A process according to claim 7 wherein the nitro-nitroso compound is bis(1-nitro-2-nitrosobutane).

11. A process according to claim 7 wherein the nitro-nitroso compound is bis(1-nitro-2-nitroso hexene-5).

12. A process for the preparation of a carboxylic acid which comprises:
    contacting an organic phase comprising an alpha nitro-ketone which contains at least four carbon atoms and which has at least one hydrogen atom attached to the same carbon atom which bears the nitro group;
    with an aqueous phase comprising an aqueous solution of a catalyst comprising a compound which, when dissolved in water, results in the production of hydroxyl ions;
    wherein said organic phase is substantially immiscible in said aqueous phase and wherein the molar ratio of water in said aqueous phase to the ketone in said organic phase is at least 0.8:1.

13. A process according to claim 12 wherein said alpha nitro-ketone has the formula:

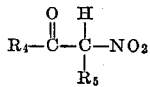

where $R_4$ is a hydrocarbon radical having between 1 and 23 carbon atoms and $R_5$ is selected from the class consisting of hydrogen and a hydrocarbon radical having between 1 and 23 carbon atoms and wherein the sum of the carbon atoms in $R_4$ and $R_5$ is between 2 and 23.

14. A process according to claim 13 wherein the catalyst is selected from the group consisting of ammonia, amines, and compounds having the formula:

MeOX where Me is any alkali metal or alkaline earth metal; O is oxygen; and X is selected from the group consisting of hydrogen, a hydrocarbon radical having between 1 and 23 carbon atoms; and

where R is any hydrocarbon radical having between 1 and 23 carbon atoms.

15. A process according to claim 12 wherein the nitro-ketone has the formula:

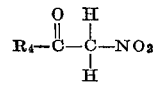

where $R_4$ is any hydrocarbon radical having between 2 and 14 carbon atoms and the catalyst is represented by the formula:

MeOX where Me is any alkali metal or alkaline earth metal; O is oxygen; and X is selected from the group consisting of hydrogen, a hydrocarbon radical having between 1 and 23 carbon atoms; and

where R is any hydrocarbon radical having between 1 and 23 carbon atoms.

16. A process according to claim 15 wherein the catalyst is sodium hydroxide.

17. A process according to claim 14 wherein the molar ratio of catalyst to ketone is between 0.01:1 and 0.1:1, the molar ratio of water to ketone is between 0.8:1 and 1000:1, and the temperature of reaction is between 20° and 150° C.

18. A process according to claim 15 wherein the alpha nitro-ketone is 1-nitro-octanone-2.

19. A process according to claim 15 wherein the alpha nitro-ketone is 1-nitro-2-oxo-hexene-5.

20. A process for the preparation of a carboxylic acid which comprises:
    preparing an alpha nitro-ketone by heating a nitro-nitroso compound where the nitro and nitroso groups are on adjacent carbon atoms and where said nitro-nitroso compound has at least four carbon atoms and at least one hydrogen atom attached to the carbon atom which bears the nitro group and at least one hydrogen atom on the carbon atom which bears the nitroso group;
    in the presence of a liquid reaction medium comprising water and an acid having a dissociation constant at 25° C. in water of greater than $10^{-2}$, and wherein the weight percent anhydrous acid content in said liquid reaction medium is less than 60, and wherein said liquid reaction medium the stoichiometric ratio of water and the stoichiometric ratio of acid to the nitro-nitroso compound are at least 0.8:1;
    and under reaction conditions such that there is substantially no thermal carbon to nitrogen bond cleavage and substantially no carbon to carbon bond cleavage;
    recovering said alpha nitro-ketone; and
    thereafter contacting an organic phase comprising said said alpha nitro-ketone with an aqueous phase comprising an aqueous solution of a catalyst comprising a compound which, when dissolved in water results in the production of hydroxyl ions, wherein said organic phase is substantially immiscible in said aqueous phase and wherein the molar ratio of water in said aqueous phase to the ketone in said organic phase is at least 0.8:1.

21. A process according to claim 20 wherein the first reaction medium comprises, in addition, an inert solvent material which is miscible with the aqueous acid and in which the nitro-nitroso compound is soluble; wherein the soluble acid is a mineral acid; wherein the nitro-nitroso compound has the formula:

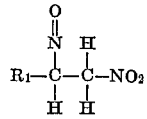

where $R_1$ is selected from the group consisting of hydrogen and a hydrocarbon radical having between 2 and 23 carbon atoms; wherein the nitro-nitroso compound is initially dissolved in said inert solvent material; wherein the stoichiometric ratio of acid to the nitro-nitroso compound in said first reaction medium is about 1:1; and wherein said second reaction medium the catalyst is represented by the formula:

MeOX where Me is any alkali metal or alkaline earth metal; O is oxygen; and X is selected from the group consisting of hydrogen, a hydrocarbon radical having between 1 and 23 carbon atoms; and

where R is any hydrocarbon radical having between 1 and 23 carbon atoms.

22. A process for the preparation of heptanoic acid which comprises:
heating bis(1-nitro-2-nitroso octane) in the presence of a first liquid reaction medium comprising water; a mineral acid having a dissociation constant in water at 25° C. of greater than $10^{-2}$; and at least enough acetone to form a one-phase reaction medium; wherein said first reaction medium the weight percent anhydrous acid is between 2 and 40 and the stoichiometric ratio of acid to the bis(1-nitro-2-nitroso octane) is about 1:1 and the stoichiometric ratio of water to the bis(1-nitro-2-nitroso octane) is at least 1:1 and under reaction conditions including a temperature between 25° C. and 80° C. such that there is substantially no carbon to nitrogen bond cleavage and substantially no carbon to carbon bond cleavage; recovering 1-nitro-octanone-2 from said first reaction medium; and thereafter heating said 1-nitro-octanone-2 to obtain said heptanoic acid while in intimate contact with a second reaction medium immiscible with said 1-nitro-octanone-2, said second reaction medium comprising an aqueous solution of a catalyst represented by the formula:

Meox where Me is any alkali metal or alkaline earth metal; O is oxygen; and X is selected from the group consisting of hydrogen, a hydrocarbon radical having between 1 and 23 carbon atoms; and

where R is any hydrocarbon radical having between 1 and 23 carbon atoms, and wherein said second reaction medium, the molar ratio of water to the nitro- ketone is at least 0.8:1.

23. A process according to claim 22 wherein the mineral acid is sulfuric acid.

24. A process for the preparation of 4-penteneoic acid which comprises:
heating bis(1-nitro-2-nitroso hexene-5) in the presence of a first liquid reaction medium comprising water, a mineral acid having a dissociation constant in water at 25° C. of greater than $10^{-2}$, and at least enough acetone to form a one-phase reaction medium, wherein said first reaction medium the weight percent anhydrous acid is between 2 and 40 and the stoichiometric ratio of acid to the bis(1-nitro-2-nitroso hexene-5) is about 1:1 and the stoichiometric ratio of water to the bis(1-nitro-2-nitroso hexene-5) is at least 1:1 and under reaction conditions including a temperature between 25° C. and 80° C. such that there is substantially no carbon to nitrogen bond cleavage; recovering 1-nitro-2-oxo-hexene-5 from said first reaction medium; and thereafter heating said 1-nitro-2-oxo-hexene-5 to obtain said 4-penteneoic acid while in intimate contact with a second reaction medium immiscible with said 1-nitro-2-oxo -hexene-5, said second reaction medium comprising an aqueous solution of a catalyst represented by the formula:

MeOX where Me is any alkali metal or alkaline earth metal; O is oxygen; and X is selected from the group consisting of hydrogen, a hydrocarbon radical having between 1 and 23 carbon atoms; and

where R is any hydrocarbon radical having between 1 and 23 carbon atoms, and wherein said second reaction medium the molar ratio of water to the 1-nitro-2-oxo-hexene-5 is at least 0.8:1.

25. A process for the preparation of a carboxylic acid which comprises:
reacting a charge stock comprising an alpha olefin having between 4 and 25 carbon atoms and a hydrogen atom on the beta carbon atom with a nitrosating agent comprising a mixture of NO and $NO_2$, wherein the molar ratio of NO to $NO_2$ is at least 1:1 and the conditions of temperature and pressure such that the $NO_2$ is substantially entirely in the vapor phase, and wherein the stoichiometric ratio of the nitrosating agent to said alpha olefin is less than 0.5;
recovering a nitro-nitroso dimer at a temperature less than 50° C., wherein the nitro groups are on the terminal carbon atoms and the nitro and nitroso groups are on adjacent carbon atoms;
heating said nitro-nitroso dimer in the presence of an aqueous mineral acid having a dissociation constant greater than $10^{-2}$ and an anhydrous weight percent mineral acid content of less than 60 based on the nitro-nitroso dimer free reaction mixture, said aqueous mineral acid being present in an amount such that the stoichiometric ratio of water and the stoichiometric ratio of mineral acid to the nitro-nitroso compound is at least 0.8:1 and under conditions such that substantially no thermal carbon to nitrogen bond cleavage and substantially no carbon to carbon bond cleavage occurs, and for a time such that a 1-nitro-2-ketone is produced;
recovering said 1-nitro-2-ketone; and heating said 1-nitro-2-ketone while in intimate contact with an immiscible water phase containing a catalyst comprising a compound which, when dissolved in water, results in the production of hydroxyl ions to produce said carboxylic acid, the amount of water being sufficient to dissolve said catalyst and provide a stoichiometric ratio of water to catalyst of at least 0.8:1.

References Cited

Merck Index, 6th ed. (1952), p. 1071.

JAMES A. PATTEN, Primary Examiner

U.S. Cl. X.R.

260—644, 593, 533, 540, 597, 413, 586, 515

PO-1050
(5/69)

UNITED STATES PATENT OFFICE
CERTIFICATE OF CORRECTION

Patent No. 3,518,302          Dated June 30, 1970

Inventor(s) Alan F. Ellis

It is certified that error appears in the above-identified patent and that said Letters Patent are hereby corrected as shown below:

Column 1, line 29, "on" should be "one".

Column 1, line 57, "bear" should be "bears".

Column 1, line 70, "reeaction" should be "reaction".

Column 3, line 11, "nitrosos" should be "nitroso".

Column 4, line 4, "componud" should be "compound".

Column 5, line 24 "fiive" should be "five".

Column 7, line 8, "as" should be "was".

Column 7, lines 31 and 32 are transposed.

Column 9, line 26, "as" should be "was".

Column 11, line 40, the semicolon has been omitted between "sodium hydroxide" and "sodium acetate".

Column 11, line 40, the semicolon has been omitted between "sodium acetate" and "sodium heptanoate".

Column 13, line 20, "ioxane" should be "dioxane".

Column 18, line 3, (claim 24, line 18 of specification) after "cleavage" "and substantially no carbon to carbon bond cleavage" has been omitted.

SIGNED AND SEALED

OCT 27 1970

(SEAL)
Attest:

Edward M. Fletcher, Jr.
Attesting Officer

WILLIAM E. SCHUYLER, JR.
Commissioner of Patents